US012166310B2

(12) United States Patent
Ko et al.

(10) Patent No.: US 12,166,310 B2
(45) Date of Patent: Dec. 10, 2024

(54) ELECTRICAL CONNECTOR HAVING INSULATIVE HOUSING WITH A REAR PLATFORM TO SECURE A SEALING MEMBER

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Te-Neng Ko, New Taipei (TW); Chien-Jen Ting, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 370 days.

(21) Appl. No.: 17/571,700

(22) Filed: Jan. 10, 2022

(65) Prior Publication Data

US 2022/0239034 A1 Jul. 28, 2022

(30) Foreign Application Priority Data

Jan. 26, 2021 (CN) ......................... 202120208478.9

(51) Int. Cl.

| | |
|---|---|
| ***H01R 13/52*** | (2006.01) |
| ***H01R 13/502*** | (2006.01) |
| ***H01R 13/516*** | (2006.01) |

(52) U.S. Cl.
CPC ....... *H01R 13/5219* (2013.01); *H01R 13/502* (2013.01); *H01R 13/516* (2013.01)

(58) Field of Classification Search
CPC ......................... H01R 13/5219; H01R 13/502; H01R 13/516; H01R 12/722; H01R 13/521; H01R 24/60; H01R 4/70
See application file for complete search history.

(56) References Cited

U.S. PATENT DOCUMENTS 7,871,288 B1 * 1/2011 Lee ...................... H01R 13/502 439/470
9,437,957 B2 * 9/2016 Lee .................... H01R 13/5202

FOREIGN PATENT DOCUMENTS

CN 205752769 U 11/2016
CN 107293894 A 10/2017

* cited by examiner

*Primary Examiner* — Briggitte R. Hammond
(74) *Attorney, Agent, or Firm* — Ming Chieh Chang

(57) ABSTRACT

An electrical connector includes: an insulative housing having a base and a rear platform; an outer cover enclosing the insulative housing to define a front chamber and a rear chamber; plural contacts secured to the insulative housing, exposed to the front chamber, and extending through the rear chamber; and a sealing member formed in the rear chamber to seal an interface between the insulative housing and the outer cover, wherein the rear platform has a peripheral face spaced a gap from the outer cover and the peripheral face has a roughened surface.

6 Claims, 6 Drawing Sheets

ELECTRICAL CONNECTOR HAVING INSULATIVE HOUSING WITH A REAR PLATFORM TO SECURE A SEALING MEMBER

BACKGROUND OF THE INVENTION

1. Field of the Invention

The present invention relates to electrical connector comprising an insulative housing, an outer cover enclosing the insulative housing to define a front chamber and a rear chamber, and a plurality of contacts secured to the insulative housing, exposed to the front chamber, and extending through the rear chamber, and a sealing member formed in the rear chamber to seal an interface between the insulative housing and the outer cover, wherein the insulative housing is designed to firmly secure the sealing member in place.

2. Description of Related Arts

China Patent No. 107293894 discloses an electrical connector comprising an insulative housing, an outer cover structure enclosing the insulative housing, a plurality of contacts secured to the insulative housing, and a rear sealing member to seal an interface between the insulative housing and the outer cover structure. Under environmental tests adhesion of the sealing member to the insulative housing and/or the outer cover structure may become deteriorated such that gas tight sealing effect is decreased.

SUMMARY OF THE INVENTION

An electrical connector comprises: an insulative housing having a base and a rear platform; an outer cover enclosing the insulative housing to define a front chamber and a rear chamber; a plurality of contacts secured to the insulative housing, exposed to the front chamber, and extending through the rear chamber; and a sealing member formed in the rear chamber to seal an interface between the insulative housing and the outer cover, wherein the rear platform has a peripheral face spaced a gap from the outer cover and the peripheral face has a roughened surface.

DETAILED DESCRIPTION OF THE PREFERRED EMBODIMENT

Figure 1:
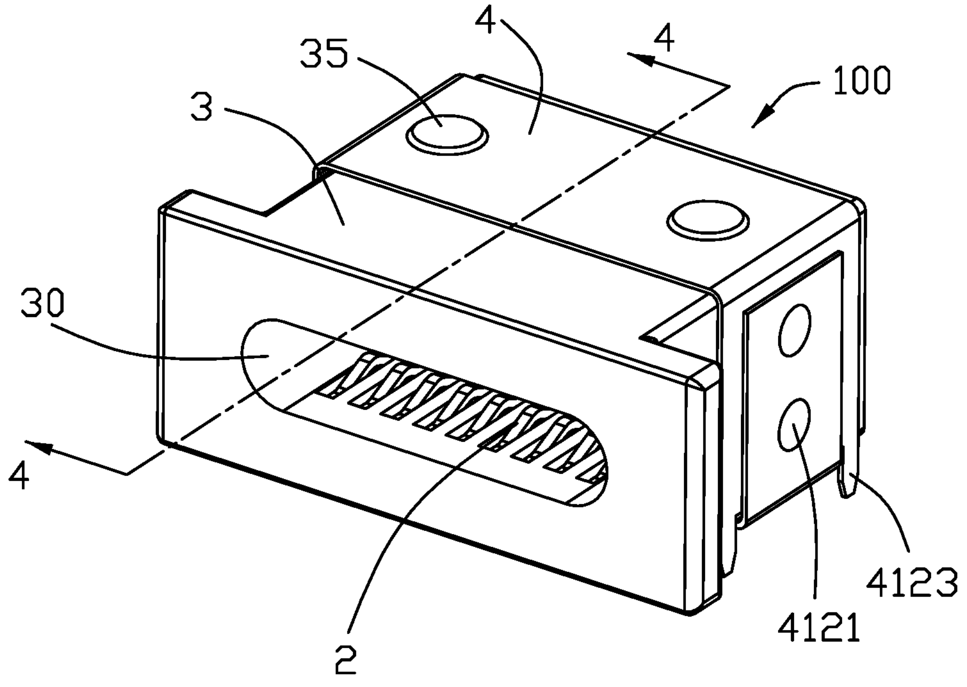
FIG. 1 is a perspective view of an electrical connector in accordance with the present invention.
Figure 2:
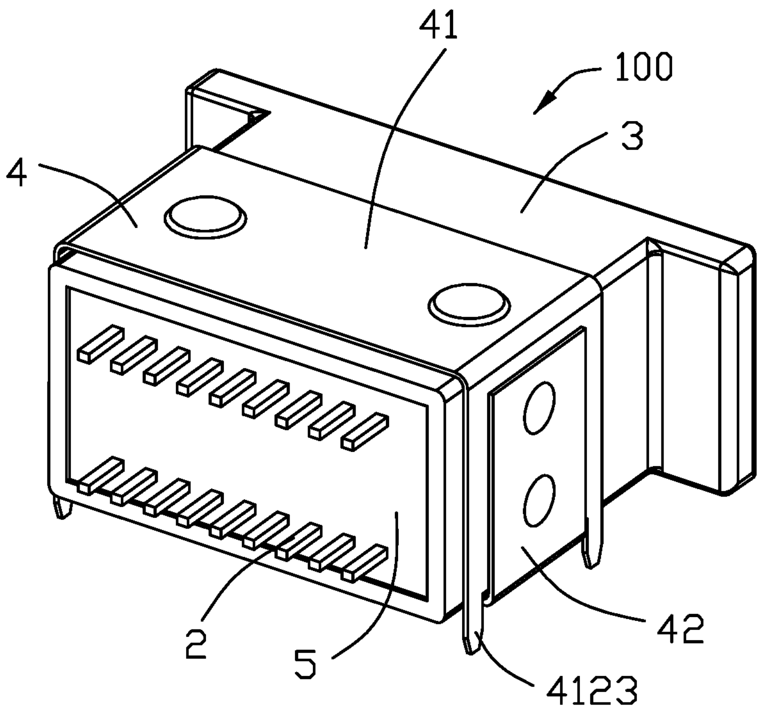
FIG. 2 is another perspective view of the electrical connector.
Figure 3:
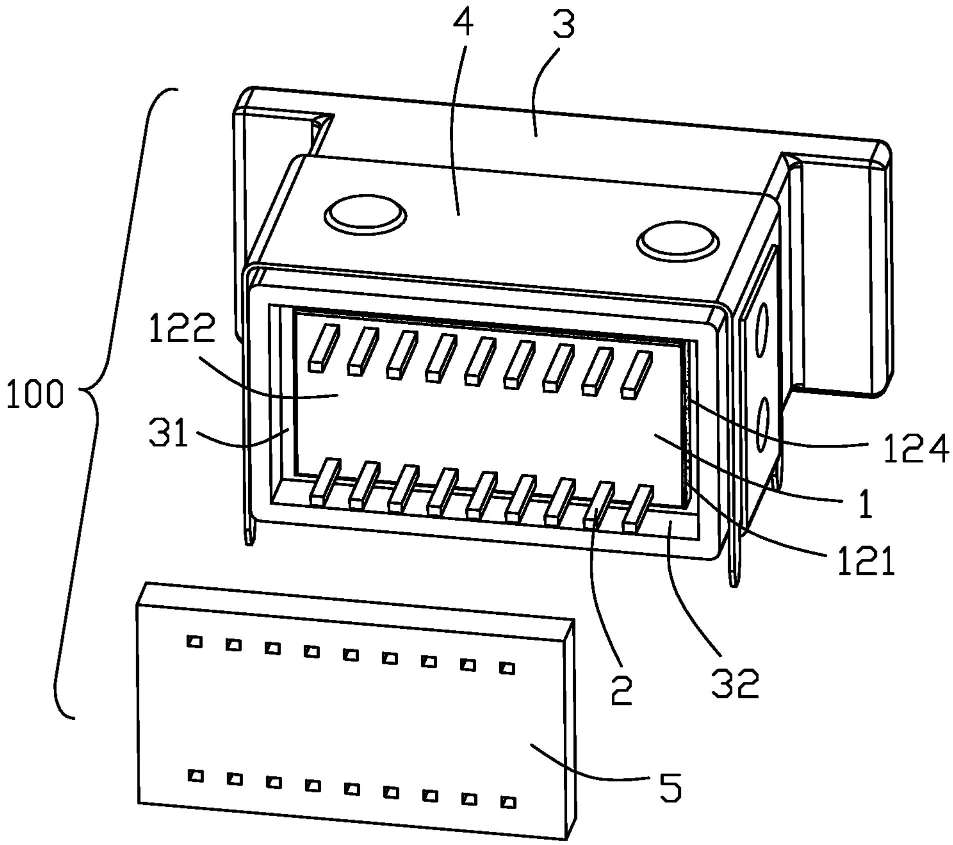
FIG. 3 is a partially exploded view of the electrical connector in FIG. 2.
Figure 4:
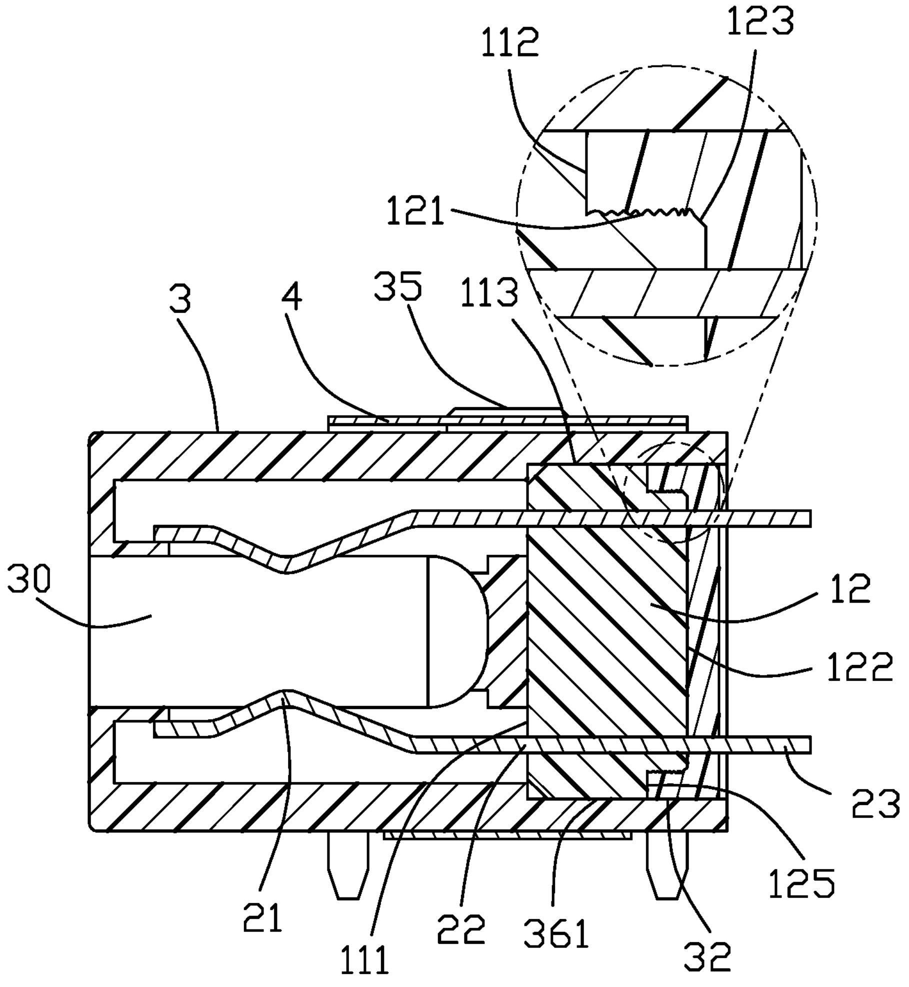
FIG. 4 is a cross-sectional view of the electrical connector taken along line A-A in FIG. 1.
Figure 5:
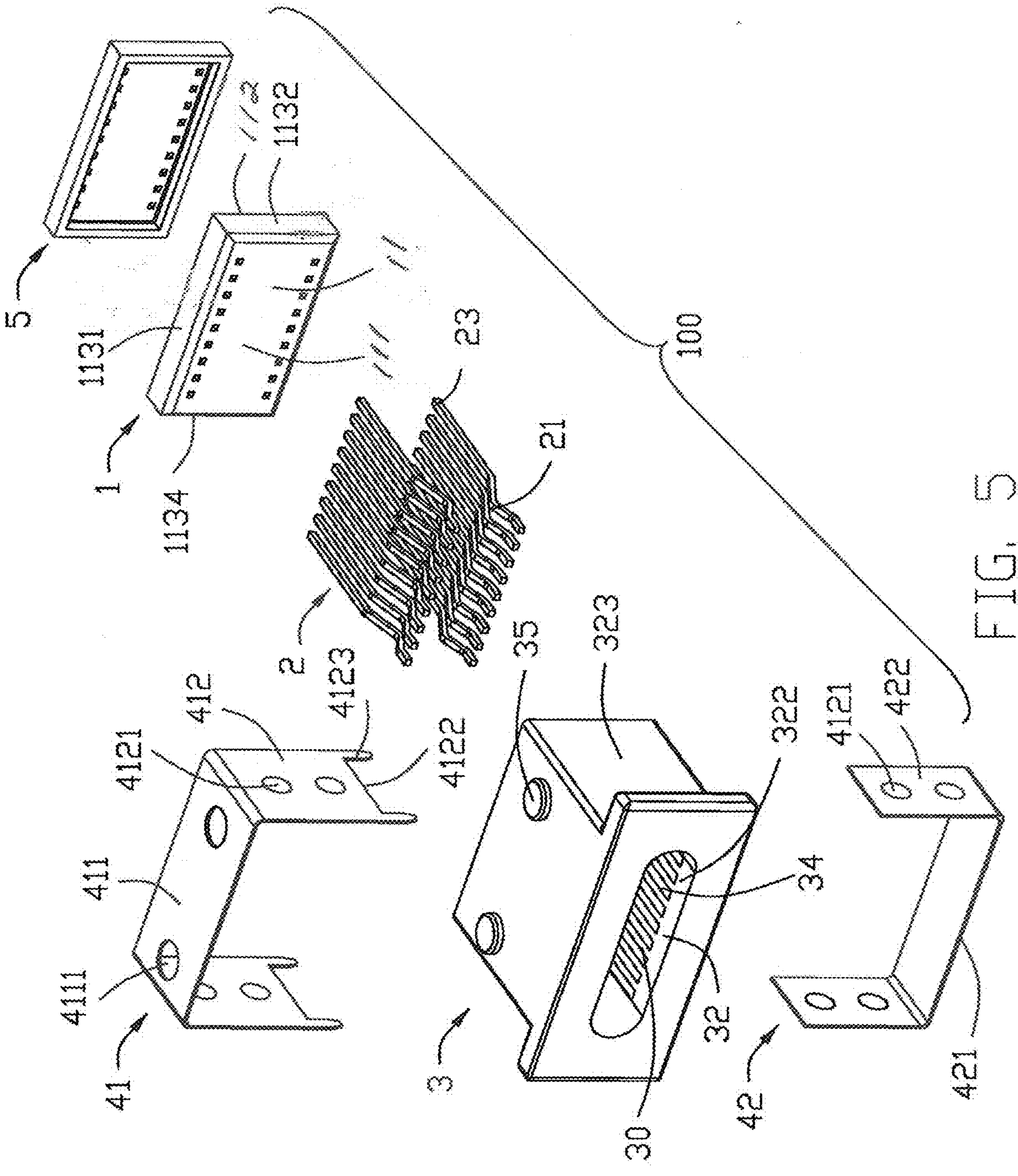
FIG. 5 is an exploded view of the electrical connector in FIG. 1.
Figure 6:
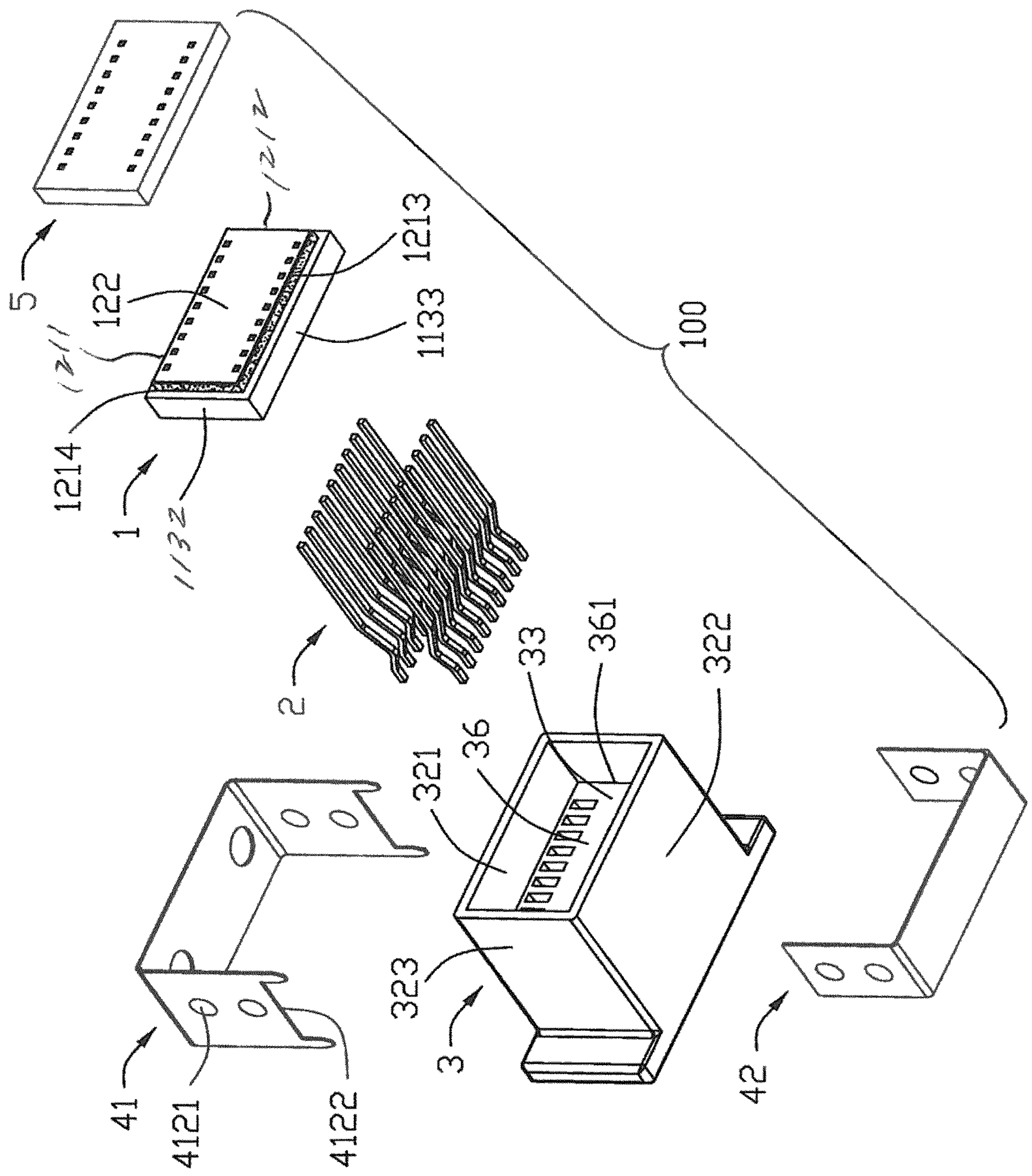
FIG. 6 another exploded view of the electrical connector in FIG. 1.

Referring to FIGS. 1 to 6, an electrical connector 100 comprises an insulative housing 1, an outer cover 3 enclosing the insulative housing 1 to define a front mating chamber 30 and a rear filling chamber 31, a plurality of contacts 2 secured to the insulative housing 1, exposed to the front chamber 30, and extending through the rear chamber 31, and a sealing member 5 formed in the rear chamber to seal an interface between the insulative housing 1 and the outer cover 3. The electrical connector 100 may further include a fixing element 4 fastened to the outer cover 3.

The insulative housing 1 includes a base 11 and a platform 12 protruding rearward from the base 11. The base 11 has a front face 111, a rear face 112, and a peripheral face 113. In this embodiment, the base 11 is substantially parallelpiped, though it may well be of other shapes. The peripheral face 113 includes a top face 1131 and a bottom face 1133 and a pair of side faces 1132 and 1134. The peripheral face 113 abuts an inner wall face 32 of the outer cover 3. In this embodiment, the platform 12 is also substantially parallelpiped, though it may be of other shapes, so that a peripheral face 121 thereof is spaced a gap 124 all way around from the inner wall face 32 of the outer cover 3. The peripheral face 121 has a roughened surface with a surface roughness Ra greater than that of the peripheral face 113 of the base 11. The platform 12 has a rear face 122 and a rounded or chamfered face 123 at a junction of the rear face 122 and the peripheral face 121. A step 125 is defined at the rear face 112 of the base 11. The peripheral face 121 includes faces 1211, 1213, 1212, and 12124 corresponding to the top and bottom face 1131 and 1133 and the pair of side faces 1132 and 1134, respectively. The chamfered face 123 ameliorates separation of the sealing member 5 from the insulative housing 1 due to different thermal coefficients of expansion thereof. In this embodiment, the surface roughness Ra of the peripheral face 121 is greater than 3.15 micrometer to obtain a stronger bond with the sealing member 5 when cured in place. Therefore, even if adhesion of the sealing member to the insulative housing and/or the outer cover were deteriorated, the sealing member 5 is still securely kept in place to perform its intended function. The rear face 122 of the platform 12 may also be roughened for further assisting in keeping the sealing member 5 in place. Moreover, the step 125 may also be roughened. The roughened face may be produced by suitable metalworking process on associated molding tools.

The outer cover 3 includes the front chamber 30 and a rear chamber 36. The rear chamber 36 has a receiving part 361 accommodating the insulative housing 1 and the filling chamber 31. The outer cover 3 has an inner wall 32 includes walls 321, 322, 323, and 324 corresponding to the top and bottom face 1131 and 1133 and the pair of side faces 1132 and 1134, respectively. The outer cover 3 is made of plastic material in this embodiment, though it may also be a metallic element. The outer cover 3 has a dividing wall 33. Slots 34 are formed on the dividing wall 33 and the walls 321 and 322 for accommodating the terminals 2. The wall 321 further has a pair of posts 35 for fastening the fixing element 4. The sealing member 5, e.g., glues cured in the filling chamber 31, is firmly secured in place, especially adhering to the peripheral face 121 of the platform 12, and to the rear face 122 of the platform 12 and the step 125 of the base 11 if roughened.

The terminals 2 are arranged in two rows and each terminal includes a contacting portion 21, a soldering portion 23, and a connecting portion 22. The connecting portion 22 is secured in the insulative housing 1 and the contacting portion 21 protrudes into the front mating chamber 30.

The fixing element 4 includes an upper piece 41 and a lower piece 42. The upper piece 41 has a top plate 411 and a pair of side plates 412. The top plate 411 has a pair of holes 4111 for receiving the pair of posts 35. Each side plate 412 has a bottom edge 4122 and a pair of legs 4123. The lower piece 42 has a bottom plate 421 and a pair of side plates 422. The lower piece 42 is spot welded to the upper piece 41 at several positions 4121.

What is claimed is:

1. An electrical connector comprising:

an insulative housing having a base and a rear platform;

an outer cover enclosing the insulative housing to define a front chamber and a rear chamber;

a plurality of contacts secured to the insulative housing, exposed to the front chamber, and extending through the rear chamber; and a sealing member formed in the rear chamber to seal an interface between the insulative housing and the outer cover; wherein the rear platform has a peripheral face spaced a gap from the outer cover and the gap is filled by the sealing member, and the peripheral face has a roughened surface for the sealing member to adhere to.

2. The electrical connector as claimed in claim 1, wherein the roughened surface has a surface roughness Ra greater than 3.15 micrometer.

3. The electrical connector as claimed in claim 1, wherein the rear platform has a substantially rectangular outer shape.

4. The electrical connector as claimed in claim 1, wherein the outer cover is made of plastic material.

5. The electrical connector as claimed in claim 1, wherein a rear face of the platform is roughened.

6. The electrical connector as claimed in claim 1, wherein the base has a rear face with a roughened step.

* * * * *